United States Patent

Bell et al.

[11] Patent Number: 5,682,670
[45] Date of Patent: Nov. 4, 1997

[54] METHOD FOR THE FABRICATION OF MULTIPOLE MAGNETS

[75] Inventors: James Fraser Bell, High Wycombe; Steven Roy Jeffrey, Kidlington; John Stewart Campbell, Garrards Cross; Lyn Holt, Long Hamborough, all of United Kingdom

[73] Assignee: Magnet Applications Limited, Herts, United Kingdom

[21] Appl. No.: 367,152

[22] PCT Filed: Jul. 12, 1993

[86] PCT No.: PCT/GB93/01444

§ 371 Date: May 3, 1995

§ 102(e) Date: May 3, 1995

[87] PCT Pub. No.: WO94/02953

PCT Pub. Date: Feb. 3, 1994

[30] Foreign Application Priority Data

Jul. 16, 1992 [GB] United Kingdom ............... 9215110

[51] Int. Cl.$^6$ .................. H02K 15/03; H01F 7/06; H01F 41/02

[52] U.S. Cl. .................. 29/609; 29/598; 29/607; 156/222; 310/150; 310/265; 335/306

[58] Field of Search ............... 29/596, 598, 602.1, 29/607, 609, 609.1; 335/302, 306; 336/234; 310/156, 265; 156/218, 221, 222, 223

[56] References Cited

U.S. PATENT DOCUMENTS

| | | | |
|---|---|---|---|
| 3,553,832 | 1/1971 | Knechtel | 29/607 |
| 3,710,291 | 1/1973 | Nicoud | 29/607 |
| 4,217,168 | 8/1980 | Ridgway et al. | 29/609 X |
| 4,272,741 | 6/1981 | Vanderknyff | 29/607 X |
| 4,908,164 | 3/1990 | Brussino . | |
| 4,998,084 | 3/1991 | Alff . | |
| 5,298,827 | 3/1994 | Sugiyama | 310/156 |

FOREIGN PATENT DOCUMENTS

| | | | |
|---|---|---|---|
| 62-52913 | 3/1987 | Japan | 29/607 |
| 5-144649 | 6/1993 | Japan | 29/607 |
| 94/14175 | 6/1994 | WIPO | 29/609 |

Primary Examiner—S. Thomas Hughes
Attorney, Agent, or Firm—Watson Cole Stevens Davis, P.L.L.C.

[57] ABSTRACT

A method of forming a multipole magnet wherein two backing sheets of paper or film material are screen or stencil printed with an ink containing magnetic particles and a carrier material to provide respective complementary patterned areas thereon, the patterned areas of ink are cured or dried, the respective ink patterns are magnetized using a magnetic field perpendicular to a plane of the backing sheets, and the sheets are combined into a laminate wherein the patterned areas are located between the two sheets.

9 Claims, 6 Drawing Sheets

FIG. 1.

FIG. 2a. TOP VIEW

FIG. 8. 1mm interlock

FIG. 9. 1mm interlock

FIG. 10. 1mm interlock

METHOD FOR THE FABRICATION OF MULTIPOLE MAGNETS

BACKGROUND OF THE INVENTION

1. Field of the Invention

The present invention relates to a method for the fabrication of multipole magnets and, in particular, to a method for the fabrication of multipole magnets having a crystalline phase of an alloy of Fe, B and R, where R is a rare earth element.

2. The Prior Art

Magnetic materials and permanent magnets are important materials which are used in many applications, including electrical appliances and electronic devices. In view of the increasing requirement for miniaturization and the greater demands placed on electrical appliances and electronic devices, there has been an increasing demand for improved magnetic materials and permanent magnets.

EP-A-0101552 describes magnetic materials based on alloys of the type Fe—B—R containing at least one stable compound of the ternary Fe—B—R type, where R is a rare earth element including yttrium, which compound can be magnetized to become a permanent magnet. The amount of rare earth R is generally in the range of from 8 to 30 atomic percent.

EP-A-0108474 describes a magnetically hard alloy composition comprising at least 10 atomic percent of one or more rare earth elements, 0.5 to 10 atomic percent of boron; and iron or mixtures of iron with a transition metal element, the alloy containing a major portion of magnetically hard, fine crystallites having an average diameter of less than 400 nanometers.

With the development of the rare-earth magnets, one of the major benefits is the high coercivity, or resistance to demagnetization. This means that a high applied magnetic field is required before any permanent damage to the magnet can occur. This is particularly relevant to magnets which are very thin (in the direction of magnetism), and already have a significant internally generated demagnetizing field due to the aspect ratio. Many applications now demand (or would benefit from) magnetic components that are very thin, due to constraints of size and weight, and can only be addressed by utilizing the high coercivity of these types of magnet.

Problems arise in respect of the magnetization of these materials as their inherently high magnetic stability means that very high external fields must be applied to achieve a high percentage of the available magnetic strength (saturation). For isotropic materials such as certain melt spun NdFeB alloys the situation is even worse because the magnetization process is attempting to magnetize the majority of grains in the material in a direction which is not a preferred or "easy" direction. Thus, in order to achieve a magnetization which is within a few percent of the saturation value, external fields of three to four times the intrinsic coercivity are required. The normal method of magnetizing these high coercivity materials is to discharge a very large current, from a bank of capacitors, through a copper coil or arrangement of copper wires. The cross sectional area of the copper wire obviously has to be large enough to prevent melting of the copper by resistance heating. It is not unusual for currents in excess of 10,000 amps to be required in order to generate sufficiently high magnetizing fields.

Apart from the fact that these materials are difficult to magnetize, the types of application for which they are required are becoming more demanding. For example, one of the major markets for these materials is in the permanent magnet components for motors. Depending on the design of the system these may be a number of separately magnetized components that are assembled in a circular arrangement or a number of magnetized "poles" may be imprinted around the circumference of a continuous ring sample. The latter is becoming the favored route as this reduces the difficulty and costs of assembly.

As motors become smaller (i.e. smaller rings) and the number of poles required increases, the difficulty of imprinting the required pattern increases, due to the physical volume of the copper windings required to generate the high fields.

The combination of materials which are difficult to magnetize, small diameter components and more complex magnetization patterns (i.e. larger numbers of poles) all combine to limit the capability of the existing capacitor discharge technology. A further limitation is the precision of the transition between the imprinted poles. For devices such as stepper motors, which rely greatly on the accuracy of the imprinted pattern and the width of the transition for precision movement, there is a need to control all aspects of the magnetization pattern; something which is exceedingly difficult to do with conventional magnetization techniques. The need for high definition of poles in all motor systems becomes more important as the efficiency of designs improves.

We have now developed a method for the production of multipole magnets which avoids the disadvantages of the prior art method discussed above.

SUMMARY OF THE INVENTION

Accordingly, the present invention provides a method for the fabrication of multipole magnets, which method comprises the steps of i) screen or stencil printing an ink comprising a mixture of particles of a magnet material and a carrier material onto a backing sheet in a predetermined pattern;

ii) curing or drying the patterned sheet and magnetizing the areas forming the predetermined pattern in step (i) using a magnetic field perpendicular to the plane of the backing sheet to produce North poles on one side of the sheet and South poles on the other side of the sheet;

iii) screen or stencil printing an ink comprising a mixture of a magnet material and a carrier material onto a backing sheet in a pattern which is complementary to the pattern in step (i), the ink being printed in those areas where no ink was printed in step (i)

iv) curing or drying the patterned sheet and magnetizing the areas forming the complementary pattern in step (iii) using a magnetic field perpendicular to the plane of the backing sheet to produce North poles on one side of the sheet and South poles on the other side of the sheet;

v) turning over the sheet from step (iv); and vi) bringing the sheet from step (ii) and the reversed sheet from step (v) together to form a laminate, thereby forming a multipole magnet.

The backing sheet which is used in the method of the present invention may be paper or a film material. Optionally, the paper or film material may be coated with a release agent.

The screen or stencil printing may be carried out according to well known techniques, using conventional screen or stencil printing equipment, using either a screen, where the mesh size is large enough to avoid clogging by the magnet particles, or more preferably (especially for relatively thick printed layers) a simple metal stencil typically of the order of 0.1 to 2 mm thick. The screen and stencil designs are produced by conventional methods.

While the magnet material may be any permanent magnetic material, it is preferred that it is an alloy of the type Fe—B—R, where R is a rare earth metal, preferably neodymium. The magnet material will generally be in the form of fine particles of a magnet powder, preferably the powder having a particle size of less than 100 micrometers. The carrier material is preferably a low viscosity carrier material, typically having a viscosity in the range of from 10 to 1000 centipoise. The carrier material may be, for example, an epoxy resin, either as a liquid resin or dissolved in suitable solvents, an air activated or chemically activated silicone rubber, a cyanoacrylate, polyvinyl alcohol, a thermosetting or thermoplastic polymer, or a low melting point metal. Epoxy resin based carrier materials are generally preferred for use in the invention.

The magnet powder is generally contained in the magnet ink in an amount of from 10 to 60% by volume of the ink composition. Preferably the magnet ink is screen printed onto the backing sheets in steps (i) and (iii) of the method of the invention and, accordingly, the ink should have a suitable viscosity for appropriate printing.

After the backing sheets have been printed in steps (i) and (iii), the patterned sheets are cured or dried prior to the magnetization step. For example, if an epoxy resin is used as the carrier material, then it can be cured to give a semi-rigid structure.

The magnetization which is carried out in steps (ii) and (iv) may be carried out using a simple magnetization field perpendicular to the plane of the backing sheet, to produce North poles on one side of the sheet and South poles on the other side of the sheet. No complicated equipment is required to effect such magnetization.

As previously indicated, the pattern which is produced in step (iii) of the method of the invention is complementary to the pattern produced in step (i) so that when the pattern sheet from step (iv) is turned over, it will match with the pattern produced in step (ii) to form a multipole magnet.

One or both of the sheets produced in steps (ii) and (iv) may be coated with an adhesive prior to the lamination in step (vi) of the method of the invention. The lamination will generally be carried out under heat and/or pressure in order to produce a stable structure. The backing sheet upon which the patterns are printed may be retained on either side of the laminate to provide physical support and protection, or if the backing sheets are coated with a suitable release agent they may be removed, thereby minimizing air gaps in the finished assembly.

Using the method of the present invention a strip of multipole magnets is produced which may then be wound around a circular former to produce a rotor assembly. Alternatively, the multipole magnet may be used in its linear form in a sensor or actuator.

The patterns which are produced in steps (i) and (iii) of the present invention may be simple patterns of a bar-type format, or may be more complex patterns which are impossible to produce by conventional magnetization methods. Furthermore, several different magnetization patterns can be combined into a single component, if desired. For example, offset patterns may be produced, such patterns being of use in stepper motors. Alternatively, graduated spacing may be provided for position sensors, or herringbone patterns produced for photocopier rollers. The definition between the poles of the multipole magnet is high using the technique of the present invention and the spacing between the poles is limited only by the resolution of the printing technique. Furthermore, the size of the component is limited only by the size of the printing equipment. Using the method of the present invention very thin multipole magnets, of the order of 0.2 mm in thickness, can be produced.

BRIEF DESCRIPTION OF THE DRAWINGS

The present invention will be further described with reference to the accompanying drawings, in which.

DETAILED DESCRIPTION OF THE PREFERRED EMBODIMENTS

Figure 1:
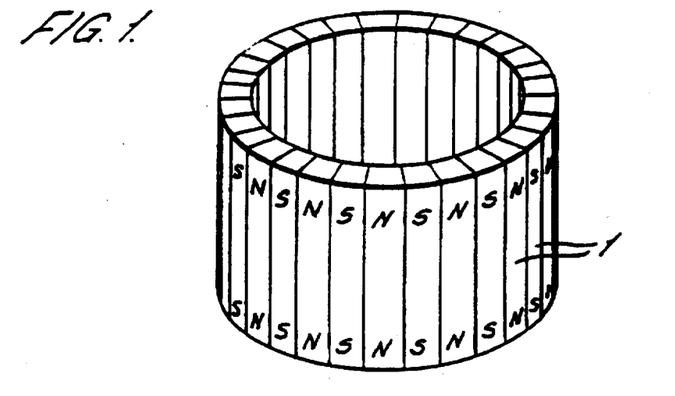
FIG. 1 is a diagram of a typical multipole motor ring.

Referring to the drawings, FIG. 1 illustrates a typical multiple motor ring comprising a plurality of magnetic sections 1. Each magnetic section 1 comprises either a South pole at the exterior surface of the ring or a North pole at the exterior surface of the ring, the North and South poles alternating around the ring. Each segment then presents the opposite pole to the inner surface of the ring, i.e., a segment which has a South pole facing outwards will have a North pole facing inwards.

Figure 2A:
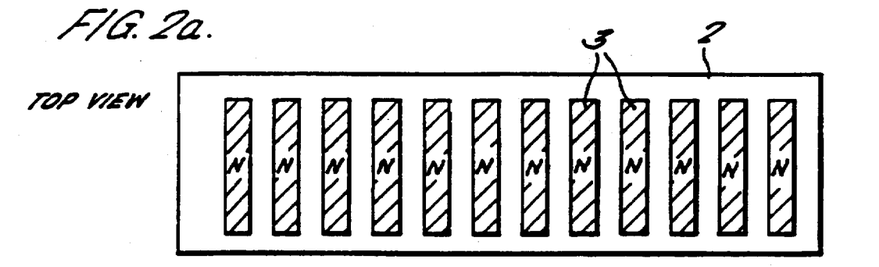
FIGS. 2a and 2b are a plan view and side elevation, respectively, of a backing sheet printed with a predetermined magnetic pattern, after magnetization.
Figure 2B:
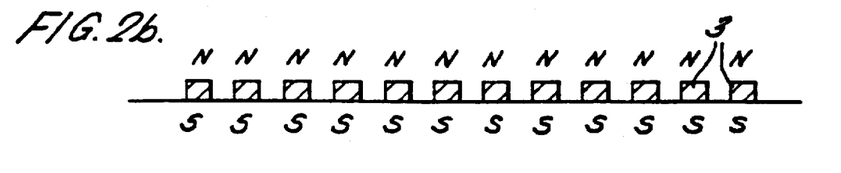

Referring to FIGS. 2a and 2b, a backing sheet 2 has a plurality of segments 3 of a magnet ink printed thereon. The printed segments 3 are arranged in a predetermined pattern and are magnetized, by means of a magnetic field, to produce a plurality of North poles facing upwardly as viewed in FIG. 2b and a plurality of South poles facing downwardly.

Figure 3:
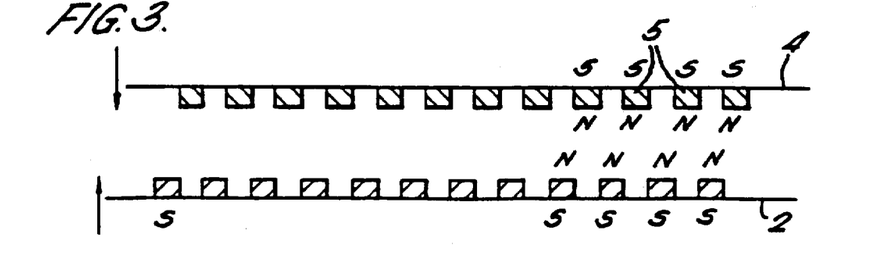
FIG. 3 illustrates two components printed with predetermined patterns, after magnetization, ready for lamination.

Referring to FIG. 3, a backing sheet 2 with its predetermined pattern of printed segments 3 has positioned thereabove a complementary sheet 4 with segments 5 printed in a predetermined pattern thereon. The printed segments 5 on backing sheet 4 are magnetized so that the North poles of the magnets face downwards and the South poles of the magnets face upwards, as viewed in section in FIG. 3. Thus, the printed pattern on backing sheet 4 is complementary to that on backing sheet 2.

Figure 4:
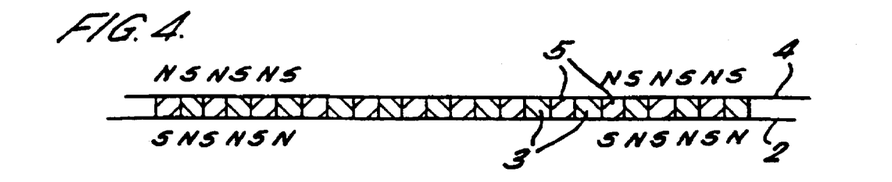
FIG. 4 illustrates the two components of FIG. 3 laminated together.

FIG. 4 illustrates the laminate produced by laminating backing sheets 2 and 4 together. It will be noted that in the finished tape, segments 3 alternate with segments 5 along the length of the tape. The backing sheets 2 and 4, if coated with a release material, may be removed from the laminated assembly, if desired.

If adhesion of the two components during the lamination process is not effected by further curing of the binder, then prior to the lamination of sheet 4 to sheet 2, one or both of the sheets is sprayed with a suitable adhesive and the lamination is then effected using heat and/or pressure.

The laminated assembly illustrated in FIG. 4 may be used to form a multiple rotor as shown in FIG. 1.

Figure 5:
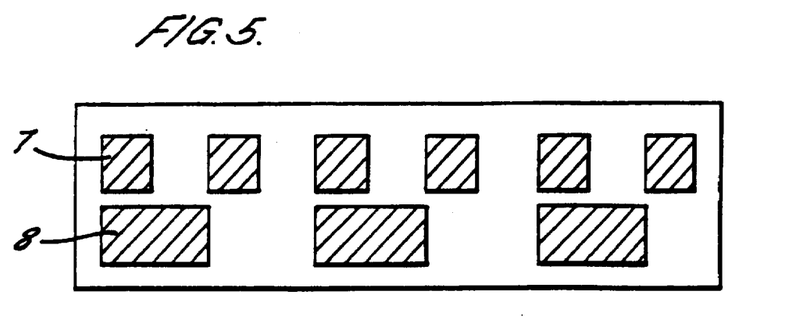
FIG. 5 illustrates an offset pattern printed on one component, for proportional control in stepper motors.

FIG. 5 illustrates one component of a laminate in which an offset pattern is printed to provide proportional control in stepper motors. The areas 7 and 8 are printed with a magnet ink in a regular pattern, but with a different pitch. The two components are then laminated in the same way as described above. The spacings between the patterned areas 7 and 8 are adapted to receive a complementary pattern printed on a second component (not shown) to form a laminate.

Figure 6:
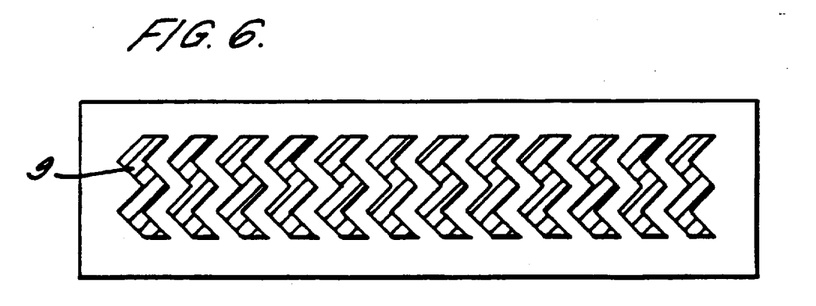
FIG. 6 illustrates a herringbone pattern printed on one component, for use in photocopier rollers.

FIG. 6 illustrates one component of a laminate in which a herringbone pattern is printed as areas 9. The spacings between the areas 9 are adapted to receive a complementary pattern printed on a second component (not shown) to form a laminate.

The present invention will be further described with reference to the following Example.

EXAMPLE 1

Figure 7:
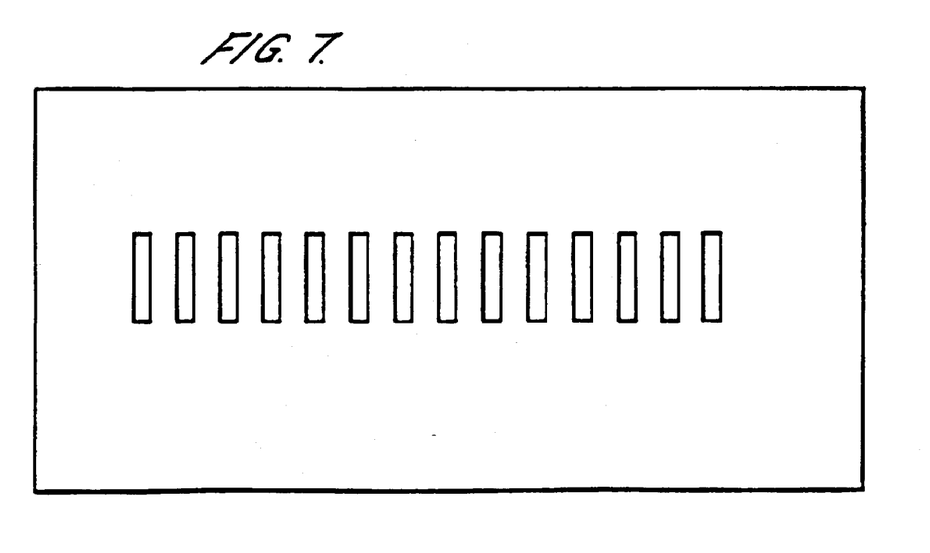
FIG. 7 illustrates a print pattern produced using a stencil mask as described in Example 1.

Printed magnet patterns were produced by screen printing a magnetic paste through a stencil mask consisting of a series of slots; 1 mm wide, 5 mm long, and spaced evenly 1.5 mm apart, cut into 0.25 mm thickness stainless steel, to produce the print pattern as shown in FIG. 7.

The magnetic paste was prepared from a 50 volume loading of Magnequench MQP-D NdFeB powder, <63 μ, in size, dispersed in a slow curing, low viscosity liquid epoxy resin system.

The paste was stencil printed by hand onto a 0.1 mm thick polyster sheet substrate and the printed sheets were then cured at 100° C. for 30–60 minutes before magnetization.

The printed magnet patterns were magnetized by placing the printed substrate between the closely spaced poles (approx. 5 mm pole gap) of an electromagnet and applying full power (120V, 12.5A) for 10 seconds.

The printed strips were thus magnetized normal to the substrate. All the print patterns were aligned the same way between the magnetizing poles such that the printed side gave a nominal "north" for the direction of magnetization (FIGS. 2a, 2b).

Pairs of printed pattern, were then laminated together, printed side inwards, to form an alternating pattern of opposite poles on such surface, with the substrate forming the outermost layers, as shown in FIGS. 3 and 4.

In practice, due to the slight "slumping" of the magnetic paste during printing and curing, the separation between printed bars needs to be slightly larger than their width in order that the two layers can interlock. In this example, bars of 1 mm width were printed onto each substrate with 1.5 mm separation between bars. By control of the distance between printed magnets on either of the two substrates the radius of curvature for an interlocked pattern can be controlled, allowing its use on, for example, a cylindrical rotor.

Magnetic "profile" measurements were carried out using a three axis (XYZ) table fitted with a high sensitivity Linear Hall Effect sensor (type UGN3503) at the base of the moving arm. Both positioning and magnetic field strength measurements of the sensor were carried out by computer control.

The results obtained for an interlocking pattern of 1 mm wide poles, with alternating north and south transitions, give good agreement with a finite element model, and shown a regular sinusoidal magnetization pattern.

Figure 8:
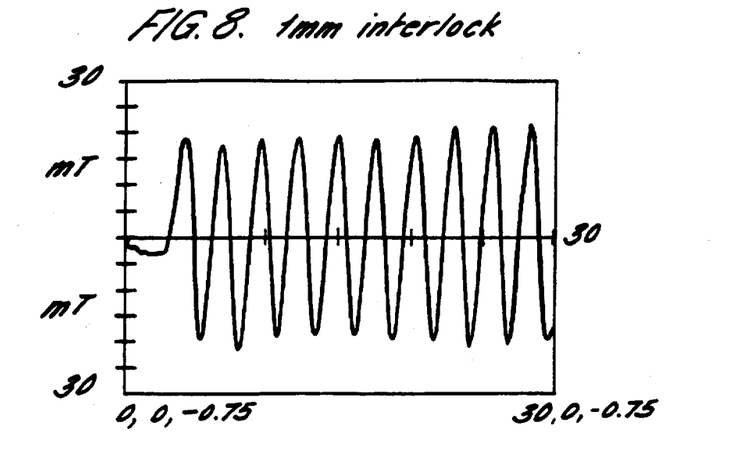
FIGS. 8, 9 and 10 illustrate the measured results for the printed magnets produced according to Example 1 at total effective airgaps of 0.7, 1.25 and 2.225 nm.
Figure 9:
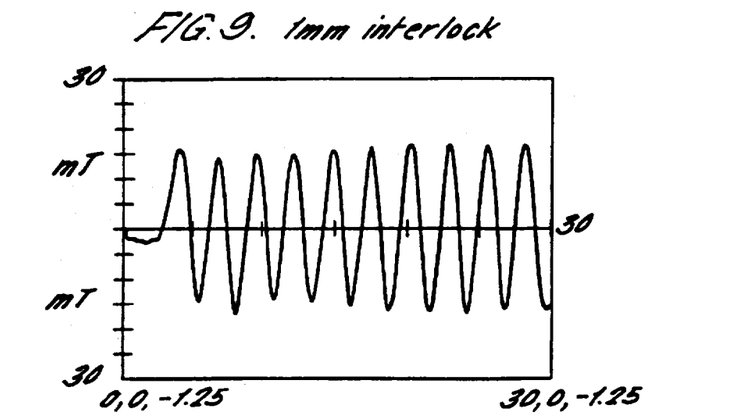
Figure 10:
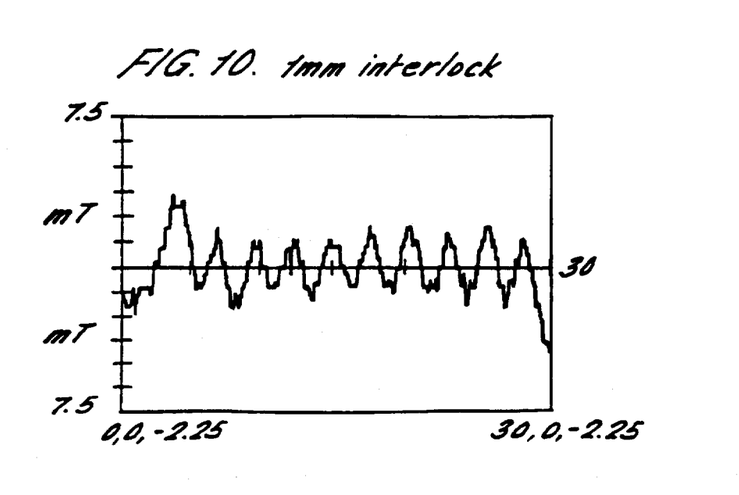

The measured results are shown in FIGS. 8, 9 and 10 for the interlocked arrangement produced above at increasing total effective airgaps (TEAGS) of 0.75, 1.25 and 2.25 mm, respectively. The TEAG is the distance from active element of the sensor and the printed magnet surface. At the substrate surface, corresponding to a TEAG of effective airgap of 0.75 mm (FIG. 8) the field varies sinusoidally along the measurement path with peak values of ±20 mT (±200 gauss) at the center of each alternating pole. At larger TEAGS of 1.25 and 2.25 mm (FIGS. 9 and 10) the measured field levels fall off.

Figure 11:
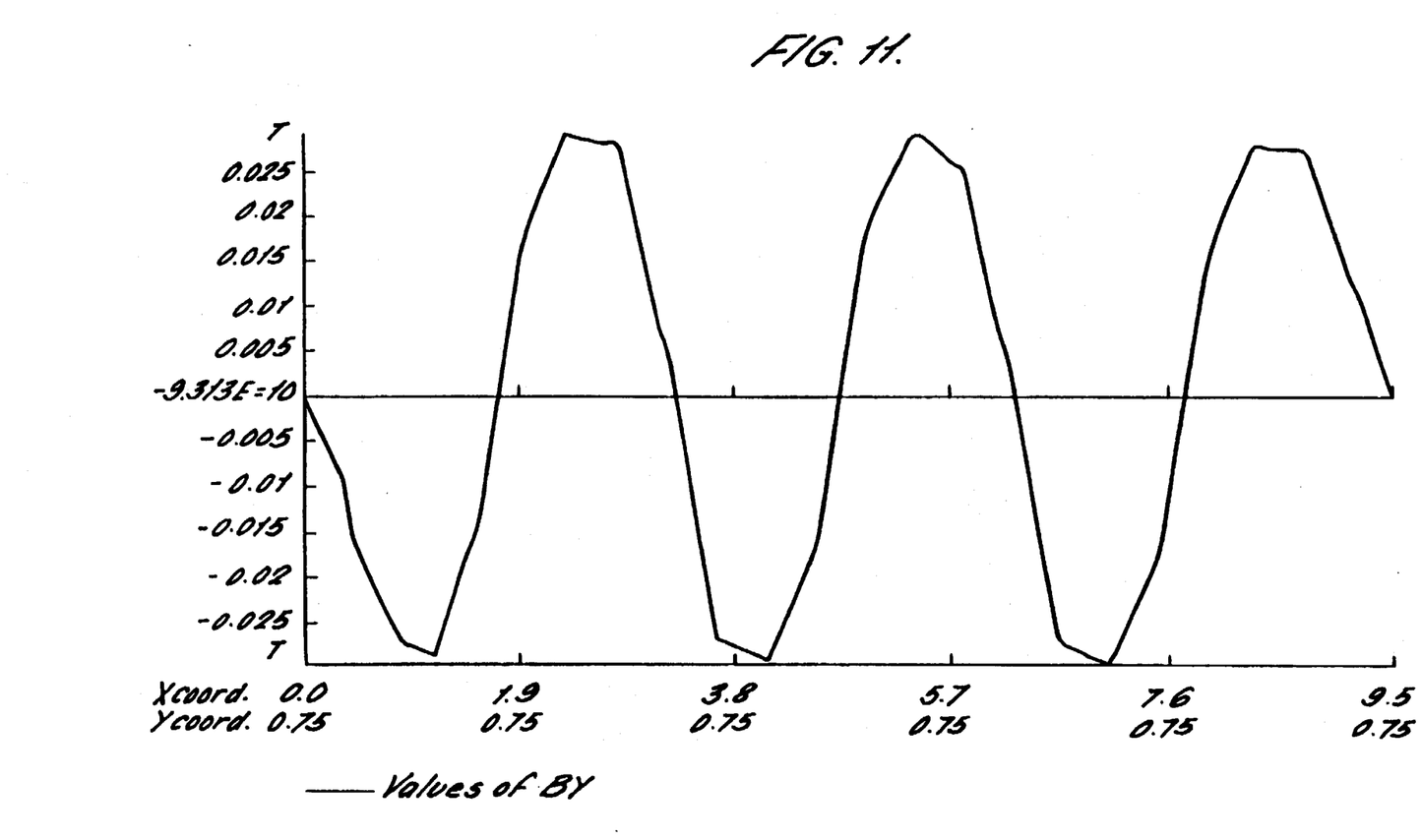
FIGS. 11, 12 and 13 illustrate the calculated effective value from finite models for the magnets of Example 1 at total effective airgaps of 0.75, 1.25 and 2.25 mm.
Figure 12:
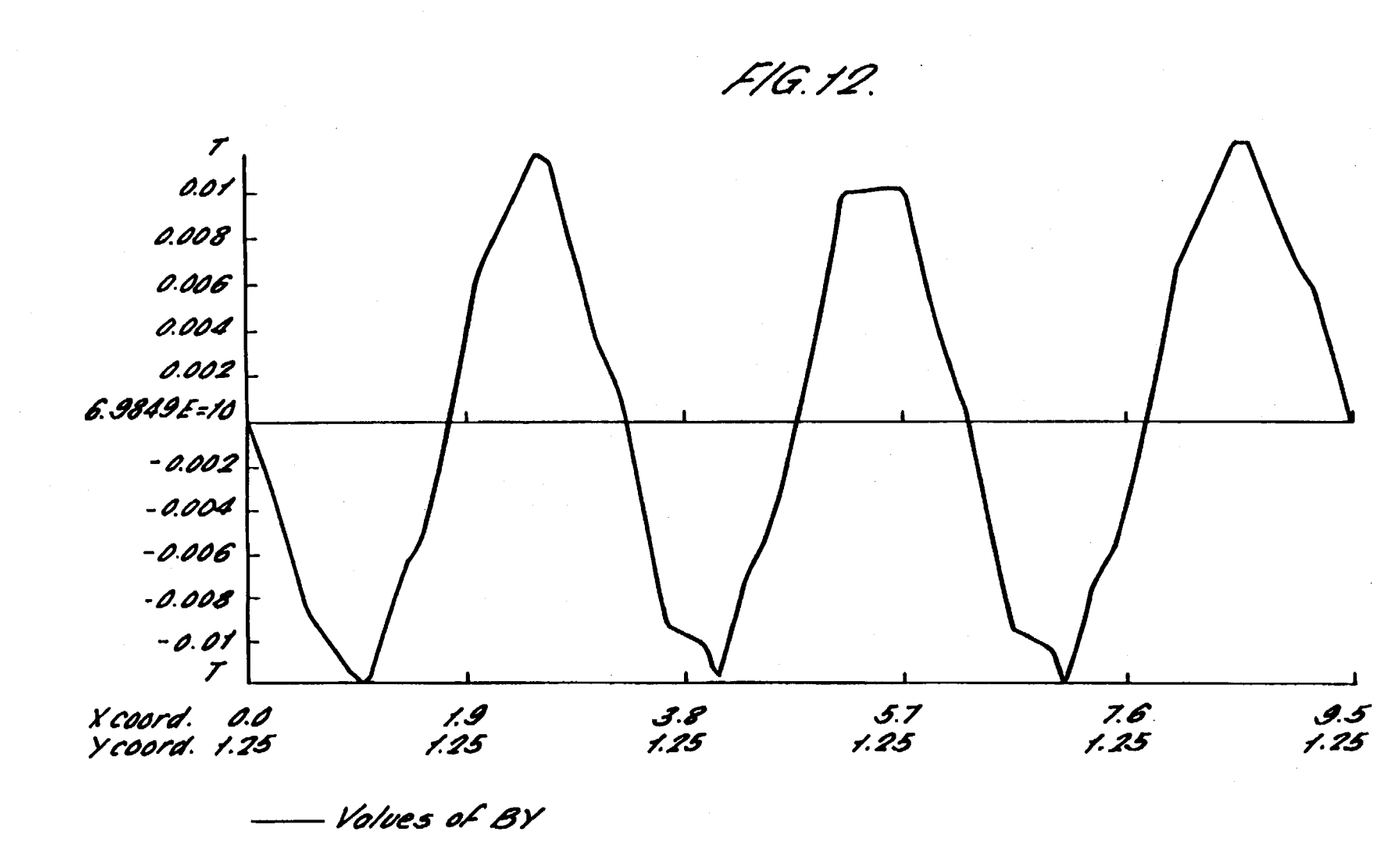
Figure 13:
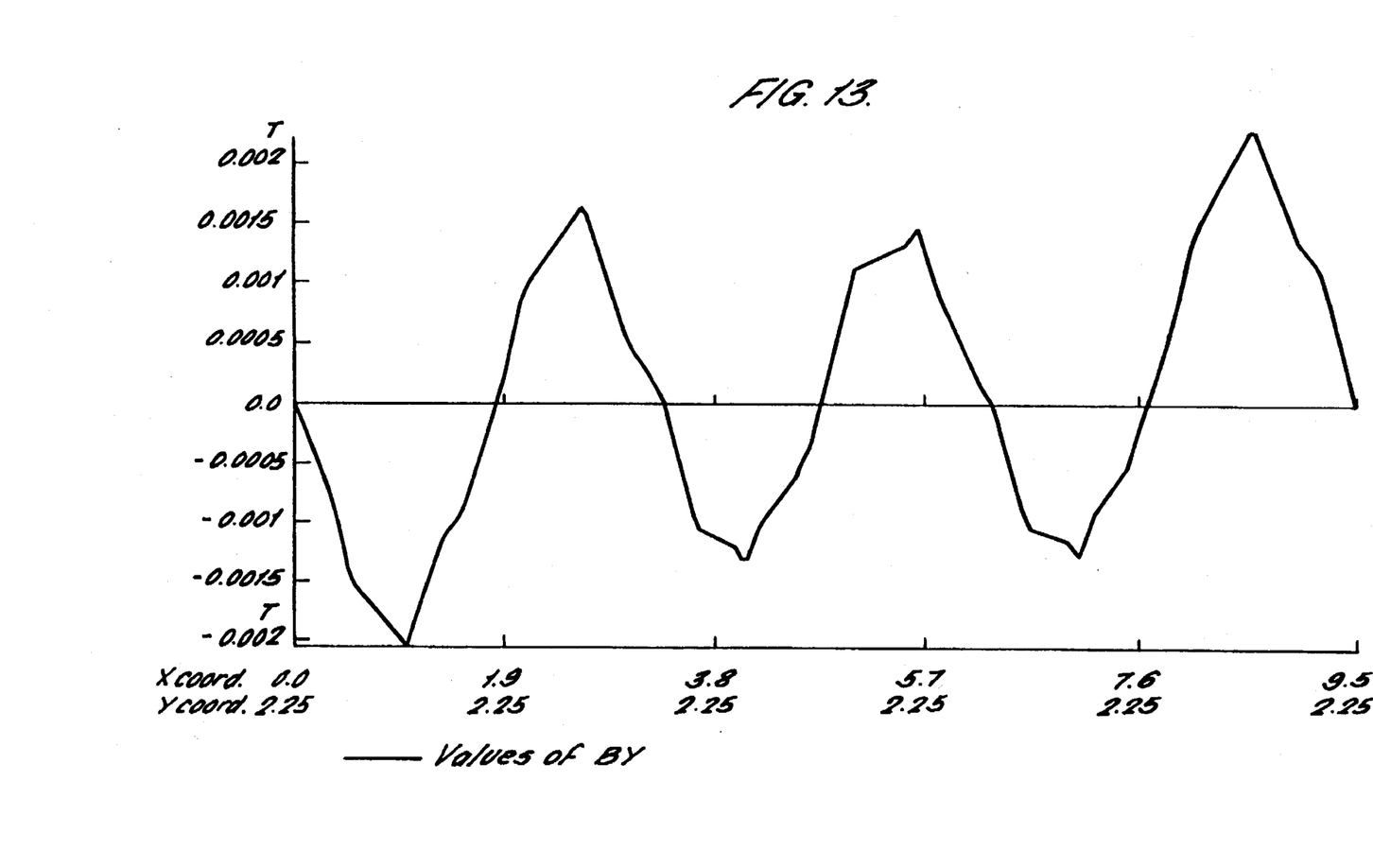

The results for FIGS. 8, 9 and 10 are in good agreement with the calculated values from the finite element model for TEAGS of 0.75, 1.25 and 2.25 mm shown in FIGS. 11, 12 and 13, respectively.

We claim:

1. A method for the fabrication of multipole magnets, which method comprises the steps of:
    i) using a technique selected from screen and stencil printing to print an ink comprising a mixture of particles of a magnet material and a carrier material onto a first backing sheet in a predetermined pattern;
    ii) subjecting the patterned first backing sheet to a process selected from curing and drying and magnetizing the areas forming the predetermined pattern in step (i) using a magnetic field perpendicular to the plane of the first backing sheet to produce North poles on one side of said first backing sheet and South poles on the other side of said first backing sheet;
    iii) using a technique selected from screen and stencil printing to print an ink comprising a mixture of a magnet material and a carrier material onto a second backing sheet in a pattern which is complementary to the pattern in step (i), the ink being printed in those areas where no ink was printed in step (i);
    iv) subjecting the patterned second backing sheet to a process selected from curing and drying and magnetizing the areas forming the complementary pattern in step (iii) using a magnetic field perpendicular to the plane of the second backing sheet to produce North poles on one side of said second backing sheet and South poles on the other side of said second backing sheet;
    v) turning over said second backing sheet from step (iv) to become reversed; and
    vi) bringing said first backing sheet from step (ii) and the reversed second backing sheet from step (v) together to form a laminate, thereby forming a multipole magnet.

2. A method as claimed in claim 1, wherein the first and second backing sheet is selected from the group consisting of paper and a film material.

3. A method as claimed in claim 1, wherein the magnet material is an alloy of the type Fe—B—R, where R is a rare earth metal.

4. A method as claimed in claim 3, wherein the rare earth metal is neodymium.

5. A method as claimed in claim 1, wherein the magnet material has a particle size of less than 100 micrometers.

6. A method as claimed in claim 1, wherein the carrier material is selected from the group consisting of an epoxy resin based carrier material, an air activated silicone rubber, a chemically activated silicone rubber, a cyanoacrylate, a polyvinylalcohol, a thermosetting polymer, a thermoplastic polymer, and a low melting point metal.

7. A method as claimed in claim 1, wherein at least one of the first and second backing sheets produced in steps (ii) and (iv) is/are coated with an adhesive prior to the lamination in step (vi).

8. A method as claimed in claim 1, wherein the first and second backing sheets are coated with a release agent and are removed after the formation of the laminate in step (vi).

9. A method as claimed in claim 1, wherein the ink is printed onto the first and second backing sheets in steps (i) and (iii), respectively, using a technique selected from screen and stencil printing.

* * * * *